Patented July 15, 1924.

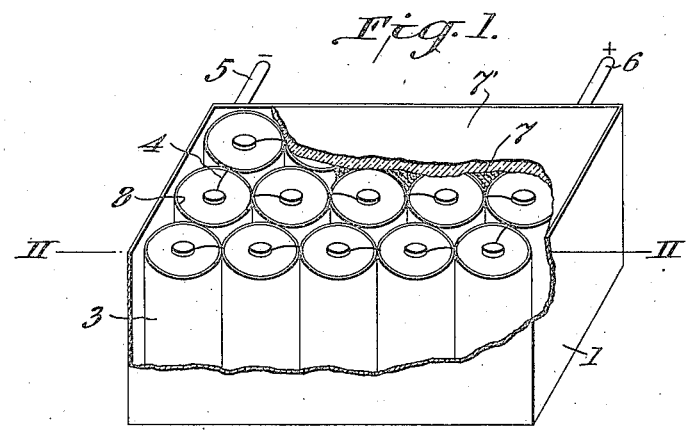
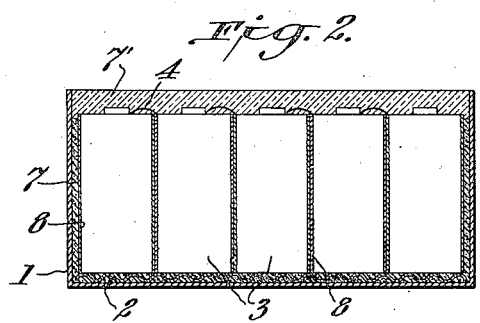

1,501,084

UNITED STATES PATENT OFFICE.

FRANK H. WRIGHT AND FREDERICK A. KELLER, OF NEW YORK, N. Y., ASSIGNORS, BY MESNE ASSIGNMENTS, TO NATIONAL CARBON COMPANY, INC., OF NEW YORK, N. Y., A CORPORATION OF NEW YORK.

DRY-CELL BATTERY AND PROCESS OF ASSEMBLING THE SAME.

Application filed May 25, 1922. Serial No. 563,618.

*To all whom it may concern:*

Be it known that we, FRANK H. WRIGHT and FREDERICK A. KELLER, citizens of the United States, residing at New York, in the county of New York and State of New York, have invented certain new and useful Improvements in Dry-Cell Batteries and Processes of Assembling the Same, of which the following is a specification.

This invention relates to electrical batteries formed of a plurality of dry cells assembled in fixed relation in a casing, and to processes of assembling such batteries. A particular object of the invention is to provide a construction in which the cells are protected from access of external moisture and in which leakage of electrolyte from the cells is positively prevented.

A moisture-proof, non-leaking construction is desirable in batteries designed for general service, and these qualities become of the highest importance for uses in which small fluctuations of E. M. F. are detrimental, as, for example, in apparatus for radio communication. The series-connected batteries, termed "plate batteries," or "B" batteries, commonly used in conjunction with apparatus comprising an electron tube and a telephone, must produce a substantially invariable E. M. F., as even minute rapid fluctuations, superposed upon the current actuating the telephone, are sufficient to interfere seriously with its action.

The present invention provides a construction preventing variations in terminal E. M. F. due to impairment of the cell insulation by access of moisture, to leakage of electrolyte, or to other causes of this general character. A preferred embodiment of the invention is illustrated in the accompanying drawing, in which—

Fig. 1 is a perspective view of a battery, partly broken away, and showing the embedding plastic about a portion of the cells only, and Fig. 2 is a vertical longitudinal section on line II—II, Fig. 1, the cells being shown in elevation.

Referring to the drawing, numeral 1 denotes a battery box or casing, which may be made of cardboard, wood or other suitable material. A sheet of corrugated cardboard 2, or similar material, is placed at the bottom of the box. The cardboard is preferably impregnated with paraffin to render it electrolyte-proof and to aid in the distribution of the sealing compound, as subsequently described. Cells 3 are arranged in the casing upon the corrugated sheet, and are preferably compactly assembled in three rows of five cells each. Connectors 4 join the cells in series and external terminals 5 and 6 are provided.

When the cells are properly assembled in the casing, an insulating sealing compound is made fluid by heating and is poured about the cells, preferably in quantity sufficient to embed them up to a point adjacent their tops. The compound should be introduced from one of the sides of the box at which the channels of the corrugated cardboard terminate so that it may enter these channels and flow therealong, displacing the air before it. In order to insure that the plastic, indicated by numeral 7, shall fill every space beneath and around the cells, we prefer to use a relatively fluid mixture.

To further insure that the sealing compound shall form a continuous layer under the cells, the corrugated cardboard carries a coating of paraffin, as previously mentioned. When the hot sealing compound reaches the cardboard, it melts and dissolves the paraffin. The resulting modification of its composition materially increases the fluidity of the sealing compound and it readily passes through the corrugations, solidifying therein to form a solid, impervious base for the cells.

The corrugated cardboard which is thus embedded in the sealing compound in the bottom of the casing retains some paraffin even after the pouring of the hot sealing compound. It provides a moisture-proof, non-frangible reinforcing member coextensive with the bottom of the casing. The sealing material is much less liable to fracture because of this reinforcement and the sheet of moisture-proof material is sufficient to prevent the entry of external moisture even if the plastic sealing material should develop fissures.

After the compound 7 has been filled into the container, the battery is sealed by flowing a suitable plastic 7' over the cells, preferably in amount sufficient to fill the casing 1. This plastic preferably has a materially higher melting point than that used for embedding the cells. It will be understood that the cells may be sealed in the usual manner before assembly in the casing, or they may be sealed by the plastic 7'.

In the form of the invention illustrated, the cells are each additionally protected by a cylindrical jacket 8 of electrolyte-proof material, which may be paper coated with paraffin or asphalt. This jacket serves to prevent the temperature of the interior of the cell from rising to an objectionable extent when the hot sealing plastic is introduced, and also obstructs the passage of liquid from the cell through fissures in the plastic, which sometimes develop when the battery is subjected to shocks.

The invention is not limited to cylindrical cells arranged as shown. Flat cells, or cells of any other desired type, as well as any desired arrangement, may be adopted.

We are aware that battery constructions in which the cells are embedded in a plastic are old, and we make no claim to this subject matter broadly. The present invention, as defined in the appended claim, is distinguished from such constructions by the provision of an improved structure and method for facilitating the production of the batteries and for insuring the continuity and impermeability of the plastic surrounding the cells.

We claim:

1. A battery comprising a casing, a plurality of cells therein, sealing material completely encasing said cells, and a reinforcing member of moisture-proof material in the portion of the sealing material under the cells.

2. A battery comprising a casing, a plurality of cells therein, sealing material completely encasing said cells, and a continuous layer of non-frangible moisture-proof material embedded in the sealing material under the cells and substantially coextensive with the bottom of said casing.

3. A battery comprising a casing, a plurality of cells therein, an insulating, waterproof cylinder encasing each of said cells, a sheet of insulating material beneath the cells and spaced in part from the bottom of the casing, and a sealing composition about said cells and between said sheet and casing.

4. A battery comprising a casing, a plurality of cells therein, corrugated material at the bottom of the casing and supporting the cells, and a sealing composition about said cells and filling the corrugations of said material.

5. In a battery, a casing, a plurality of cells in said casing and positioned to receive an insulating plastic therearound, and means for facilitating the distribution of the plastic in a desired portion of the casing, said means comprising a member carrying a substance miscible with the plastic and adapted to increase its fluidity.

6. In a battery, a casing, a plurality of cells in said casing and positioned to receive an insulating plastic therearound, and means providing channels under the cells and supporting the cells, said means carrying a readily fusible substance adapted to dissolve in the plastic and to increase the fluidity thereof.

7. Process of securing efficient distribution of plastic used for embedding battery cells, comprising placing adjacent said cells a substance miscible with the plastic and adapted to increase its fluidity.

8. Process of embedding battery cells in a plastic insulating composition, comprising placing adjacent a portion of the cells a substance adapted to increase the fluidity of the plastic, and introducing the plastic at a temperature sufficient to cause admixture of said substance with the plastic, whereby the fluidity of the latter is increased and uniform distribution obtained.

9. Process of securing efficient distribution of plastic used for embedding battery cells, at a point remote from that at which the plastic is introduced, comprising placing paraffin adjacent the bottoms of said cells, and filling the plastic into the battery at a temperature sufficient to cause it to dissolve the paraffin, whereby the fluidity of the plastic is increased.

10. Process of assembling a battery, comprising encasing a plurality of cells in waterproof insulating jackets, placing a corrugated cell-supporting sheet impregnated with a readily fusible substance in the bottom of a casing, assembling the cells in said casing, and filling the spaces about and beneath the cells with a plastic insulating material adapted to dissolve said readily fusible substance and to have its fluidity increased thereby.

In testimony whereof, we affix our signatures.

FRANK H. WRIGHT.
FREDERICK A. KELLER.